2 Sheets—Sheet 1.

I. KENDRICK.

Apparatus for Promoting Combustion in Furnaces.

No. 8,908. Reissued Sept. 30, 1879.

WITNESSES.

Geo. A. Vaillant.

M. A. Cheyney

INVENTOR.

Isaac Kendrick, by J. Snowden Bell, atty.

THE NORRIS PETERS CO., WASHINGTON, D. C.

I. KENDRICK.

Apparatus for Promoting Combustion in Furnaces.

No. 8,908. Reissued Sept. 30, 1879.

WITNESSES.

Geo. A. Vaillant.

M. Abreymy

INVENTOR.

Isaac Kendrick by J. Thorndike Bell

Atty.

THE NORRIS PETERS CO., WASHINGTON, D. C.

UNITED STATES PATENT OFFICE.

ISAAC KENDRICK, OF PHILADELPHIA, PENNSYLVANIA.

IMPROVEMENT IN APPARATUS FOR PROMOTING COMBUSTION IN FURNACES.

Specification forming part of Letters Patent No. 209,273, dated October 22, 1878; Reissue No. 8,908, dated September 30, 1879; application filed July 11, 1879.

*To all whom it may concern:*

Be it known that I, ISAAC KENDRICK, of the city and county of Philadelphia, in the State of Pennsylvania, have invented certain new and useful Improvements in Methods and Apparatus for Promoting Combustion in Furnaces, of which improvements the following is a specification.

The object of my invention is to complete and perfect the combustion of fuel in furnaces by affording a proper supply of oxygen within the furnace to the gases liberated from the burning fuel, and thereby, as far as practicable, to utilize the combustible elements of the fuel by the consequent consumption of those products of combustion which would, under ordinary circumstances, pass unconsumed to and out of the chimney.

To this end my improvements consist in a process of supplying oxygen to a furnace or combustion-chamber by commingling air and steam in a mixing-chamber exterior to the furnace, leading the mingled air and steam to an expansion-chamber or retort within the furnace, highly heating the mingled air and steam within said expansion-chamber by the direct heat of the burning fuel, and finally discharging the mingled and highly-heated air and steam in a finely-divided state into the furnace above the bed of burning fuel, or into the gases generated thereby.

My improvements further consist in the construction and combination of devices for carrying such process into effect, said devices embracing a mixing-chamber, valved air and steam pipes, and an injecting device communicating therewith, and an expansion-chamber or distributing-retort located within the furnace, all as hereinafter more fully set forth.

Figure 1:
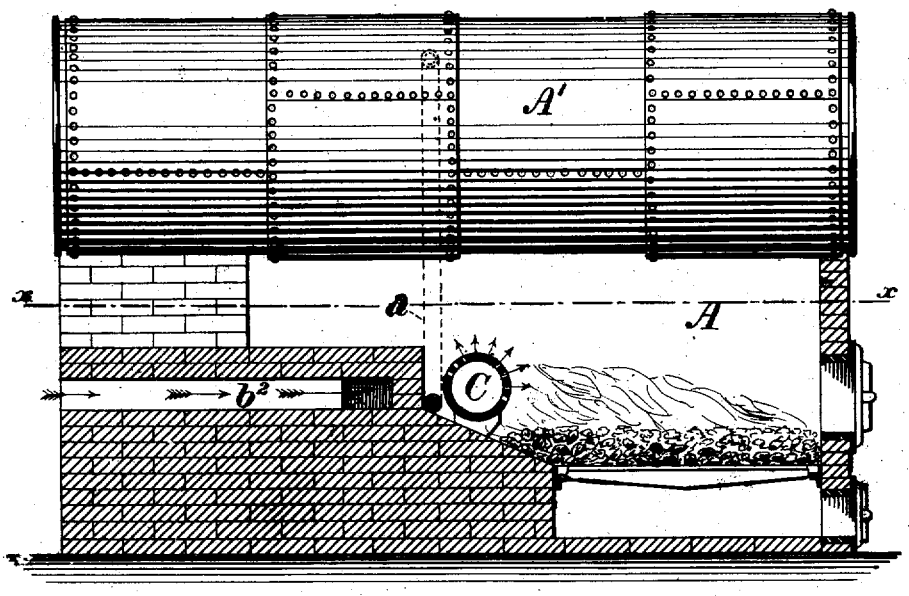
Figure 2:
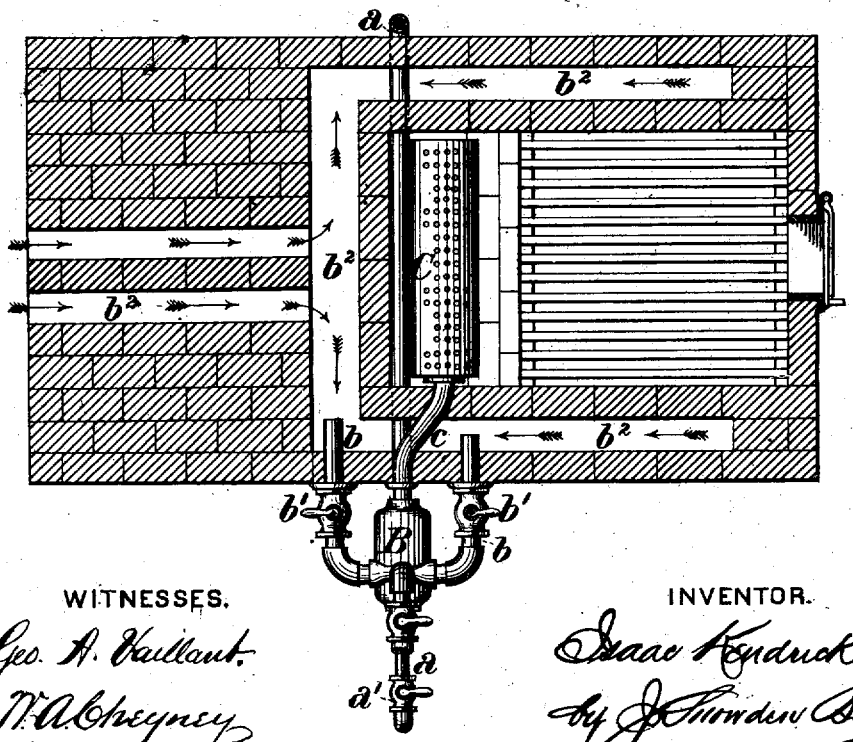
Figure 3:
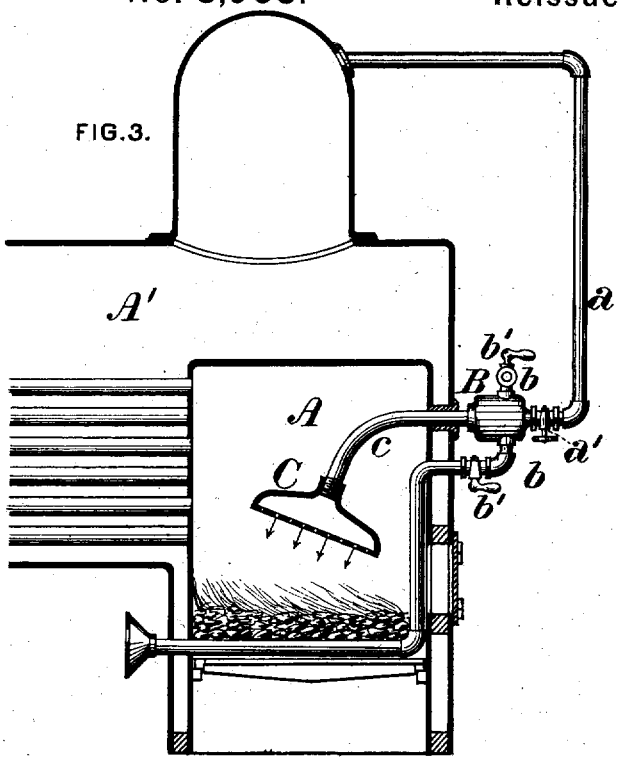
Figure 4:
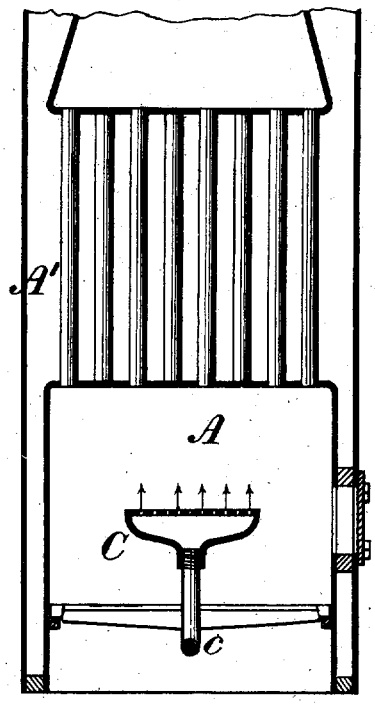
Figure 5:
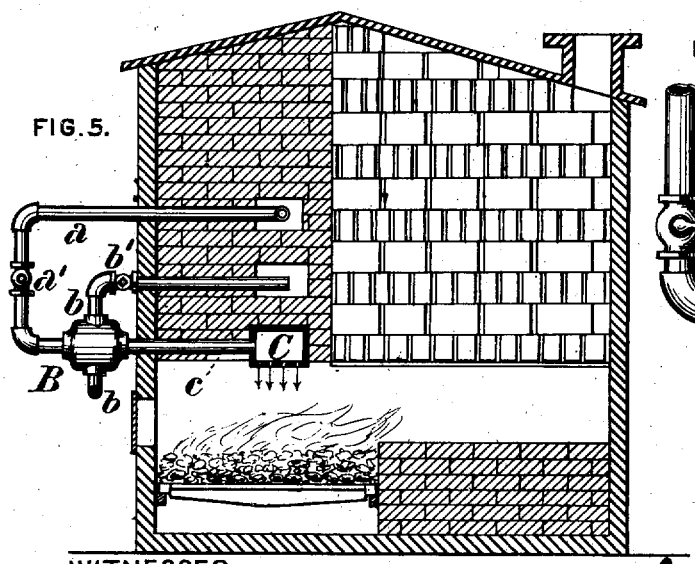
Figure 6:
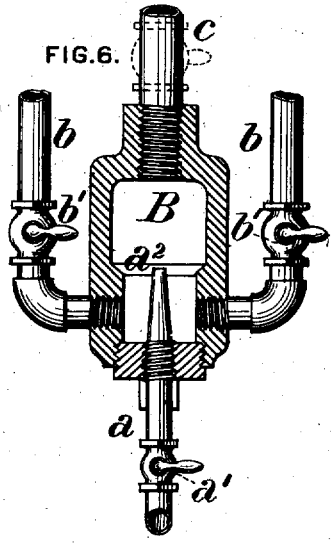

In the accompanying drawings, Figure 1 is a vertical longitudinal central section through the setting of a horizontal stationary steam-boiler with my improvements applied; Fig. 2, a horizontal section through the same at the line *x x* of Fig. 1, with the heating and distributing retort in elevation; Fig. 3, a vertical longitudinal central section through a portion of a locomotive-boiler; Fig. 4, a similar section through an upright stationary boiler; Fig. 5, a section through a brick-kiln, with my improvements applied in each instance; and Fig. 6, a central section, on an enlarged scale, through the mixing-chamber.

The process of consuming volatile products liberated from burning fuel by supplying heated air or air and steam to a furnace, it is to be understood, is not claimed as my invention, such having been long since proposed and embodied in devices of different descriptions, shown and described in sundry Letters Patent of the United States and Great Britain, and in printed public works. Heretofore, however, in supplying steam and air to furnaces to promote combustion therein, due regard has not been paid to the proportions in which the same were provided; nor, so far as I am aware, have mingled air and steam been reheated in an expansion-chamber or retort after their union has taken place and before discharging them into the furnaces. The result of this neglect or absence of invention has been that, the supply or proportions of such air and steam not having been duly regulated, nor any reheating in such expansion-chamber or retort having been effected after the mingling of the air and steam, and before their discharge, the carbon in the inflammable gases of the furnace did not unite with the air and steam, whence imperfect combustion resulted.

With my invention the air and steam are mingled in such proportions, and reheated to such a degree after mingling, that when supplied to a furnace each atom of carbon in the gases of the latter is furnished with its equivalent of oxygen, the atoms instantly combining and producing perfect and complete combustion of such gases and every part thereof.

To carry out my invention I support in any convenient position upon or adjacent to the exterior of a furnace, A, a mixing-chamber, B, the same consisting of a hollow casting of any suitable metal, having one or more side openings for the admission of air, and an opening in each of its ends, one of said end openings being connected, by a steam-supply pipe, *a*, provided with a cock or valve, $a^1$, with the steam space or dome of the boiler A′, and the other by a delivery-pipe, *c*, with a heating and distributing retort, C, located within the furnace, and to be presently described.

Air-supply pipes *b*, each of which has a regulating cock or valve, $b^1$, by which the quantity of air supplied to the mixing-chamber can be regulated as required, are connected to the side openings of the chamber B, through which pipes air (which has been, by preference, previously heated by passing through channels or conduits $b^2$ in the setting, or otherwise) is drawn, by the jet of steam which enters the mixing-chamber through the steam-supply pipe $a^1$, into the mixing-chamber with the steam.

The steam-supply pipe *a* terminates in a contracted nozzle, $a^2$, within the chamber, said nozzle having its opening slightly in advance of the side air-supply openings, and acting on the principle of an injector, to draw in air through said openings and the pipes connected thereto.

When, for special purposes, a pure flame, free from sulphur, is required, and it is desired to make use of a hydrocarbon or other gas in lieu of coal as a fuel, I attach another pipe to one of said side openings, and connect the same with a gas retort, holder, or well.

The mixing-chamber B is connected, by the delivery-pipe *c*, which opens into the end opposite to that which carries the supply-pipe *a* and nozzle $a^2$, with an expansion-chamber or heating and distributing retort, C, located at any convenient point within the furnace, or upon the bridge-wall thereof, so as to receive the direct radiant heat of the fuel therein.

The retort C is a chamber, of iron or other material capable of resisting a high heat, perforated with numerous small holes, and may be of cylindrical, semi-cylindrical, rectangular, or other form, as may be preferred by the constructer or rendered advisable by the shape, dimensions, or character of the furnace in which it is to be used.

The capacity of the distributing-retort should be so large relatively to the diameter of the delivery-pipe *c* and the combined area of the series of discharge-openings with which the retort is perforated as to permit of the expansion and consequent temporary detention within the retort of the entering current of mingled air and steam, so as to expose the same while within the retort to the direct heat of the furnace, for the purpose of highly heating it prior to its discharge through the exit-openings into the products of combustion arising from the burning fuel.

The purpose of the distributing-retort is, first, to receive and subject the mingled air and steam delivered to it from the mixing-chamber to the influence of a high heat—*i. e.*, a red heat—whereby the air and steam are in a measure resolved into their constituent gases; and, second, to break up, discharge, and distribute the same in a divided condition over the furnace-bed, or into the inflammable products of combustion of the furnace, preferably in a direction oblique to the line of the draft-current of the furnace, so that the elements of such highly-heated air and steam are brought forcibly into collision with the combustible products of the furnace, thus furnishing each atom of carbon in said products with its equivalent of oxygen, and thereby securing perfect and complete combustion.

The proportionate diameters of the steam and air pipes leading to the mixing-chamber must be governed, to some extent, by the character of the fuel burned in the furnace and the construction and uses of the latter. Under ordinary circumstances the higher the temperature of the air and steam before being admitted to the mixing-chamber the better the results. The temperature to which the mingled air and steam should be raised, or the temperature of the distributing-retort, in which they expand and from which they are discharged, is, as already stated, a red heat. The volume of air and steam admitted to the furnace must be governed by the judgment of the operator, according to the condition of the fire and the amount and character of the fuel being consumed.

I have produced very thorough combustion of the gases of anthracite coal in a boiler-furnace with a steam-jet of one-eighth of an inch, and two air-pipes, each one inch and a half in diameter, leading to a mixing-chamber of larger capacity than said pipes combined, the outlet therefrom to the distributing-retort being a pipe two and one-half inches in diameter. I do not, however, restrict myself to these measurements or proportions, as the same may be greatly varied within my invention.

The operation is substantially as follows: Steam being provided and the distributing-retort having been heated to a sufficiently high temperature—*i. e.*, a red heat—the supply-valves are opened, admitting air and steam to the mixing-chamber, where the air and steam mingle and proceed by the delivery-pipe to the distributing-retort, where they expand and are thereby detained until they are, in a measure, resolved into their constituent gases; after which they are discharged through the outlets of the distributing-retort into the furnace or into the red-hot inflammable products of combustion of the furnace, furnishing each atom of carbon in said products with its highly-heated equivalent of oxygen, which results in the immediate union or combination of such carbon and oxygen equivalent, thereby insuring perfect and complete combustion.

The advantages of my invention are briefly as follows: Reliable devices are provided by which an adequate and properly-prepared supply of oxygen may be fed to a furnace in suitable proportions, and in such condition that when discharged into the furnace an immediate union of the gases takes place, thereby insuring perfect and complete combustion, and, by the utilization of all the elements of the fuel and the obtention of their relative and entire calorific effect, great economy in fuel is secured, the gain being the additional heat-atoms developed in burning the gases that usually escape by way of the chimney or stack unconsumed.

I am aware that the employment of air and steam forced or injected, either separately or together, into a furnace as a means of promoting combustion therein, has been heretofore known, and do not, therefore, broadly claim a process or apparatus for feeding mingled air and steam to a steam-boiler or other furnace.

I claim as my invention and desire to secure by Letters Patent—

1. The improvement in the art of promoting combustion in furnaces, which consists in first commingling or mixing air and steam in regulated proportions in a mixing-chamber exterior to the furnace; then leading the mingled air and steam to an expansion-chamber or retort within the furnace, said expansion-chamber being of enlarged capacity relatively to its supply-pipe; then highly heating the mingled air and steam in said expansion-chamber by the direct heat of the burning fuel; and, finally, discharging the mingled and highly-heated air and steam in a finely-divided state over the bed of fuel, or into the combustion-chamber of the furnace, substantially as set forth.

2. The combination, with a furnace for generating steam or other purposes, of an external mixing-chamber in which air and steam are mingled in regulated proportions, an expansion-chamber or distributing-retort located within the furnace and exposed to the direct heat of the fuel, said chamber being of enlarged capacity relatively to its supply-pipe, being connected by a delivery-pipe with the external mixing-chamber, and having numerous small discharge openings or perforations, and an injecting device for feeding mingled air and steam from the mixing-chamber to the expansion-chamber or distributing-retort, substantially as set forth.

3. The combination, with a furnace for generating steam or other purposes, of a mixing-chamber for mingling air and steam in regulated proportions, flues or pipes in which air is heated prior to being fed to the mixing-chamber, a perforated expansion-chamber of enlarged capacity relatively to its supply-pipe, said chamber being located within the furnace and connected by a delivery-pipe with the mixing-chamber, and an injecting device for feeding mingled air and steam from the mixing-chamber to the expansion-chamber or distributing-retort, substantially as set forth.

ISAAC KENDRICK.

Witnesses:
J. SNOWDEN BELL,
W. A. CHEYNEY.